United States Patent
Barker et al.

(10) Patent No.: US 11,085,316 B2
(45) Date of Patent: Aug. 10, 2021

(54) BLADE OUTER AIR SEAL FORMED OF LAMINATE AND HAVING RADIAL SUPPORT HOOKS

(71) Applicant: United Technologies Corporation, Farmington, CT (US)

(72) Inventors: William M. Barker, North Andover, MA (US); Thomas E. Clark, Sanford, ME (US); Daniel J. Whitney, Topsham, ME (US); Winston Gregory Smiddy, Saco, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 189 days.

(21) Appl. No.: 16/108,335

(22) Filed: Aug. 22, 2018

(65) Prior Publication Data

US 2020/0063592 A1 Feb. 27, 2020

(51) Int. Cl.
*F01D 11/08* (2006.01)
*F02C 7/20* (2006.01)

(52) U.S. Cl.
CPC .............. *F01D 11/08* (2013.01); *F02C 7/20* (2013.01); *F05D 2230/642* (2013.01); *F05D 2240/11* (2013.01)

(58) Field of Classification Search
CPC ...... F01D 11/08; F02C 7/20; F05D 2230/642; F05D 2240/11
See application file for complete search history.

(56) References Cited

U.S. PATENT DOCUMENTS

| | | | | |
|---|---|---|---|---|
| 4,199,151 A * | 4/1980 | Bartos | ................ | F01D 11/005 277/306 |
| 6,884,026 B2 * | 4/2005 | Glynn | ................ | F01D 11/08 415/113 |
| 7,278,820 B2 * | 10/2007 | Keller | ................ | F01D 11/08 415/173.1 |
| 8,061,977 B2 * | 11/2011 | Keller | ................ | F01D 21/045 415/173.1 |
| 9,140,140 B2 * | 9/2015 | McMillan | ............ | F01D 25/243 |

(Continued)

FOREIGN PATENT DOCUMENTS

EP 2514929 A2 10/2012
EP 3081759 A1 10/2016

OTHER PUBLICATIONS

European Search Report for EP Application No. 19192941.3 dated Jan. 8, 2020.

*Primary Examiner* — Igor Kershteyn
*Assistant Examiner* — Joshua R Beebe
(74) *Attorney, Agent, or Firm* — Carlson, Gaskey & Olds, P.C.

(57) ABSTRACT

A gas turbine engine includes a turbine blade extending radially outwardly to a radially outer tip and for rotation about an axis of rotation. A blade outer air seal is positioned radially outwardly of the radially outer tip of the turbine blade. The blade outer air seal has a forward hook at an axially forward location and an aft hook at an axially aft location. An axial direction is defined by a rotational axis of the turbine blade. The blade outer air seal has a central web extending axially between the forward and aft hooks. The forward and aft hooks extend generally radially outward from the central web, and have slots for being received on forward and aft support hooks of a blade outer air seal support.

2 Claims, 6 Drawing Sheets

(56) References Cited

U.S. PATENT DOCUMENTS

| | | | |
|---|---|---|---|
| 9,863,265 B2 | 1/2018 | Stapleton | |
| 9,863,538 B2* | 1/2018 | Duguay | F01D 25/246 |
| 9,903,228 B2* | 2/2018 | Durie | F02C 7/04 |
| 10,100,659 B2* | 10/2018 | Lamusga | F01D 11/08 |
| 10,400,896 B2* | 9/2019 | Davis | F16J 15/3288 |
| 2004/0062639 A1* | 4/2004 | Glynn | F02C 7/20 |
| | | | 415/134 |
| 2004/0062640 A1 | 4/2004 | Darkins, Jr. et al. | |
| 2007/0077141 A1* | 4/2007 | Keller | F01D 11/08 |
| | | | 415/136 |
| 2007/0280820 A1 | 12/2007 | Roberts et al. | |
| 2009/0010755 A1* | 1/2009 | Keller | F01D 21/045 |
| | | | 415/197 |
| 2010/0047061 A1 | 2/2010 | Morrison | |
| 2012/0270006 A1* | 10/2012 | McMillan | F01D 25/243 |
| | | | 428/77 |
| 2014/0294572 A1 | 10/2014 | Hillier et al. | |
| 2015/0292361 A1* | 10/2015 | Durie | B29C 70/222 |
| | | | 415/200 |
| 2016/0061330 A1* | 3/2016 | Davis | F16J 15/328 |
| | | | 277/355 |
| 2016/0169025 A1* | 6/2016 | Lamusga | F01D 11/08 |
| | | | 415/173.1 |
| 2016/0312637 A1* | 10/2016 | Duguay | F16J 15/3288 |
| 2017/0044920 A1* | 2/2017 | Vetters | F01D 11/12 |
| 2018/0051590 A1 | 2/2018 | Tableau et al. | |
| 2018/0142572 A1 | 5/2018 | Quennehen et al. | |
| 2018/0230064 A1 | 8/2018 | Lamusga et al. | |

\* cited by examiner

BLADE OUTER AIR SEAL FORMED OF LAMINATE AND HAVING RADIAL SUPPORT HOOKS

BACKGROUND

This application relates to a blade outer air seal formed of a plurality of laminate wherein support hooks extend generally radially outwardly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

Blade outer air seals have been proposed made of ceramic matrix composite fiber layers.

SUMMARY

In a featured embodiment, a gas turbine engine includes a turbine blade extending radially outwardly to a radially outer tip and for rotation about an axis of rotation. A blade outer air seal is positioned radially outwardly of the radially outer tip of the turbine blade. The blade outer air seal has a forward hook at an axially forward location and an aft hook at an axially aft location. An axial direction is defined by a rotational axis of the turbine blade. The blade outer air seal has a central web extending axially between the forward and aft hooks. The forward and aft hooks extend generally radially outward from the central web, and have slots for being received on forward and aft support hooks of a blade outer air seal support.

In a featured embodiment according to the previous embodiment, the blade outer air seal is formed of a plurality of laminate.

In a featured embodiment according to any of the previous embodiments, each of the forward and aft hooks includes at least one central laminate and a forward most and an aft most laminate.

In a featured embodiment according to any of the previous embodiments, the at least one central laminate includes a plurality of laminate, and the at least one central laminate is formed as a separate portion, with both the forward most and aft most laminate extending from the forward and aft hooks into portions extending along the central web.

In a featured embodiment according to any of the previous embodiments, the term extending generally radially inwardly is defined by a line taken from as an axially central point at a radially outermost point on of each the forward and aft hook the line extending inwardly to intersect the rotational axis, and an axial center of the forward and aft hook through a distance between the axially central point on the radially outermost point, and a radially inner end of the slot, is within 10° of the line.

In a featured embodiment according to any of the previous embodiments, the laminate are formed of ceramic matrix composites.

In a featured embodiment according to any of the previous embodiments, the aft hook is pressure loaded against an aft static member when the gas turbine engine is operated.

In a featured embodiment according to any of the previous embodiments, the aft static member is an aft seal.

In a featured embodiment according to any of the previous embodiments, the aft support hook is also provided with a radially spaced second hook that does not extend through a slot in the aft hook and the support hooks extending into ditches in the aft seal to provide a stop surface.

In a featured embodiment according to any of the previous embodiments, an axial seal against an axially forward face of the forward hook.

In a featured embodiment according to any of the previous embodiments, the axial seal is a brush seal.

In a featured embodiment according to any of the previous embodiments, a point of contact between the axial seal and the forward hook is within the distance.

In a featured embodiment according to any of the previous embodiments, the aft hook has a bulged noodle port extending in a direction that includes both a radial and an axial component, and creating a hollow, and the hollow is filled with a fiber and matrix material.

In a featured embodiment according to any of the previous embodiments, the slots are generally rectangular.

In a featured embodiment according to any of the previous embodiments, the slots are formed about a curve.

In a featured embodiment according to any of the previous embodiments, there is an anti-rotation mating structure between at least one of the slots and at least one of the support hooks.

In a featured embodiment according to any of the previous embodiments, there is one slot in one of the forward and aft hook, and two slots in the other of the forward and aft hooks.

In a featured embodiment according to any of the previous embodiments, there is one slot in the forward hook and two slots in the aft hook.

In a featured embodiment according to any of the previous embodiments, the forward slot and the aft slots are circumferentially spaced.

In a featured embodiment according to any of the previous embodiments, the forward slots are radially inward of the aft slot to facilitate assembly of the blade outer air seal onto the blade outer air seal support while moving in an aft to forward direction.

These and other features may be best understood from the following drawings and specification.

DETAILED DESCRIPTION

Figure 1:
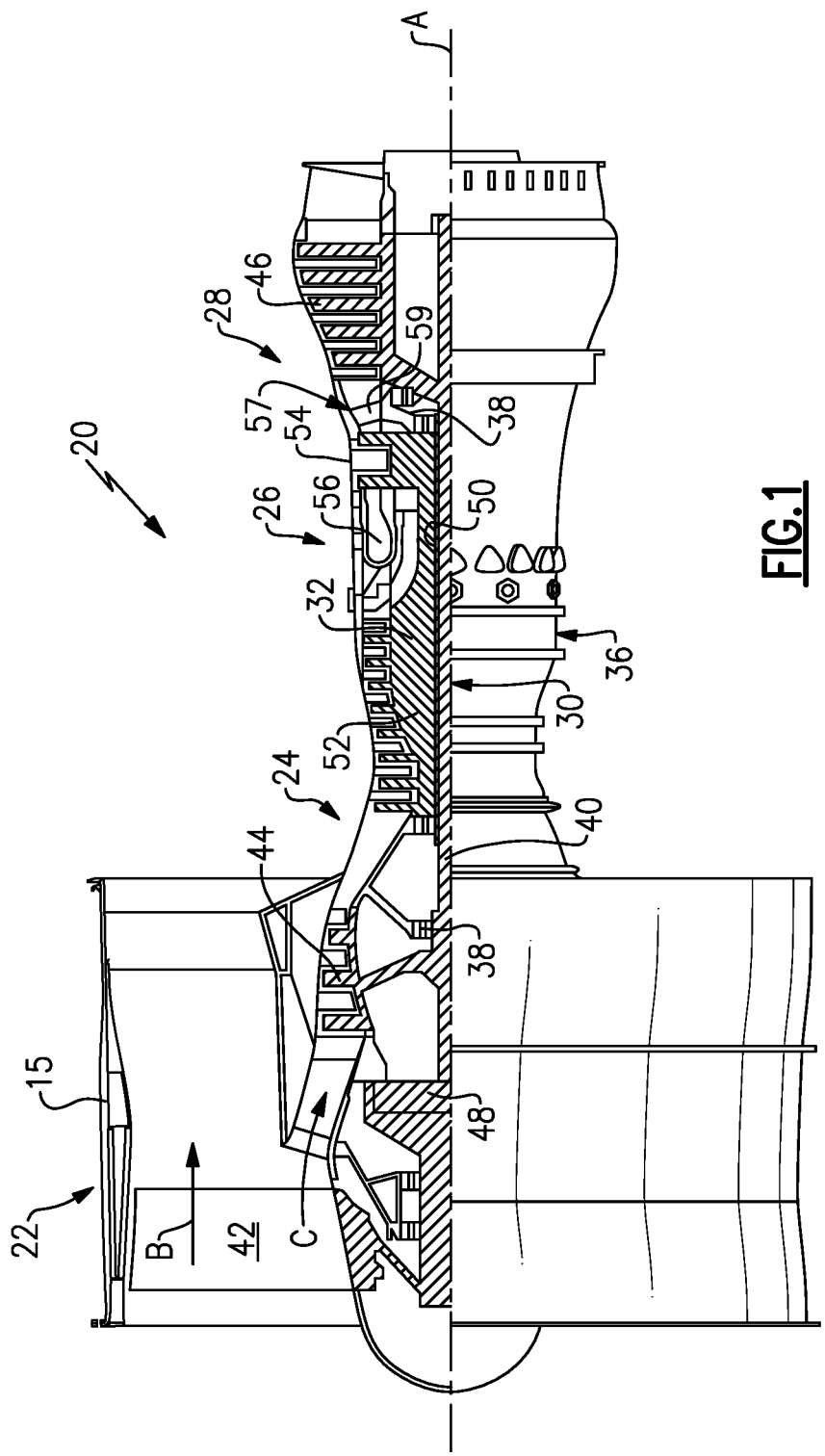
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
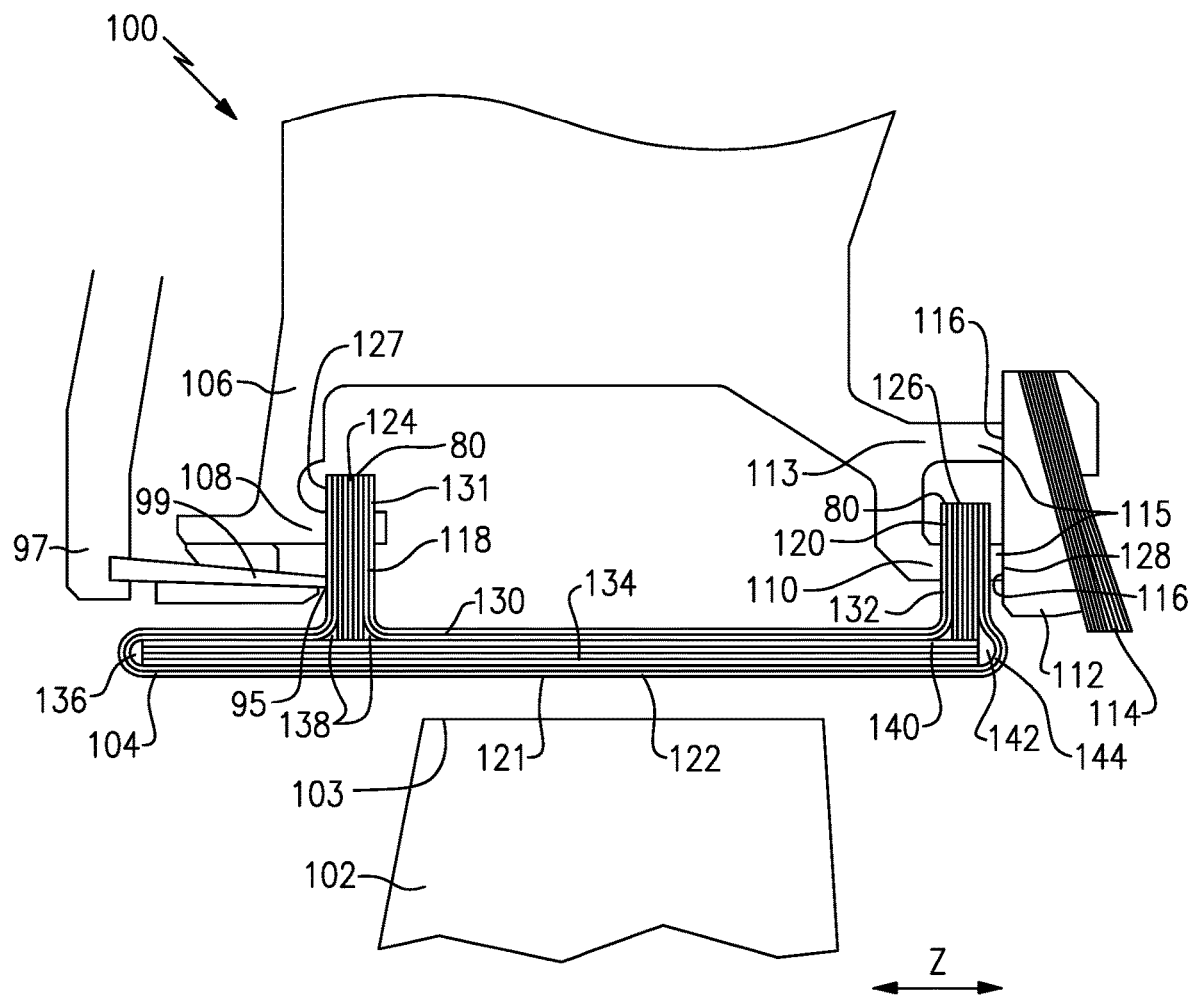
FIG. 2 shows a turbine section.

FIG. 2 shows a turbine section 100 having a turbine blade 102 extending to a radially outer tip 103. As known, it is desirable to pass the bulk of products of combustion downstream of the combustor section (see FIG. 1) across the turbine blades. Thus, a blade outer air seal ("BOAS") 104 is positioned slightly radially outwardly of the outer tip 103.

The BOAS 104 may be formed of ceramic matrix composites ("CMC"). The particular BOAS 104 is formed of a plurality of laminate of CMC materials.

A support 106 for the BOAS 104 has a forward hook 108 and a rear hook 110. As is clear, the forward hook 109 and the rear hook 110 are separate spaced components.

As can be appreciated in this figure, a forward vane support 97 receives an axial seal 99 that contacts a forward support or hook 118 from the BOAS 104 at a point 95. The forward hook 118 is supported on hook 108, and an aft support or hook 120 of the BOAS 104 is supported on hook 110. The details of this support will be described below.

As can be appreciated, the pressure at the forward end of FIG. 2 (to the left) is greater than the pressure downstream of the blade 102. As such, during operation, there will be a force urging BOAS 104 in the aft direction. As shown, the BOAS bottoms out against a seal 112 having a brush seal portion 300. 112 seals against a vane (not shown).

Seal 112 provides a bottom out support which axially retains the BOAS 104 at a desired location. As shown, hook 110 is associated with a paired hook 113 and hooks 110 and 113 each have an extension 115 abutting seal 112 at 116. This ensures that the BOAS 104 will not be urged against the seal 112 to an undesirably large extent.

As can be appreciated, the BOAS 104 is formed of a plurality of layers. An outer wrap 122 extends across a central web 121, and into forward outer layer 127 and aft outer layer 128. Hook 118 is formed with a central support layer 124, and hook 120 has a similar central support layer 126. An inner BOAS member 130 has edges 131 and 132 which also form a portion of the hook 118 and 120, respectively. A central support layer 134 is also included. As can be appreciated, central support layers 124 and 126 abut central support layer 134.

As can be appreciated, each of the layers 122, 124, 126, 130, and 134 may be formed of a plurality of layers. In addition, voids 136, 138, 140, and 142 may be filled with an appropriate material. In at least one embodiment, the areas may be filled with fiber which is then impregnated with an appropriate matrix. Details of the manufacture and materials for at least one version of an acceptable BOAS may be found in patent application Ser. No. 16/055,636, filed on Aug. 6, 2018 and entitled "Blade Outer Air Seal Reinforcement Laminate."

The hook 118 and 120, in this embodiment, extend generally radially outwardly. Within one meaning of the term "generally radially outwardly," as utilized in this application, an outer end 80 may be defined, at an axially center point. If a line is drawn radially inwardly toward an axis of rotation Z of the blade 102 from point 80, the center of the support layers 118 and 120 will be within 10° of that line at least radially inward passed the slots (disclosed below) which receive the hooks 108 and 110.

By forming the hook supports to be extend generally radially outwardly, the manufacture of the laminate BOAS is greatly simplified over traditional BOAS which have hook supports which bend in an axial direction to sit upon a hook on a support, such as hooks 110/108. In this case, the radial load is large and could challenge traditional hooks. The radial support hooks allow the radial load to be more effectively distributed into the BOAS core structure to prevent delamination of the CMC as might occur with prior art shaped hooks. The radial load is due to a pressure load where the high pressure is on the outboard side of the BOAS and the low pressure side is on the radially inboard side of the BOAS (gaspath). The BOAS stay inboardly pressure loaded due to this pressure differential.

In addition, the seal point 95 is simplified over such prior art BOAS in that the hook 118 has a generally straight surface at the seal contact point 95. Another feature shown in this view is a bulge or "noodle" region 144. The noodle region does move away from the "generally radial" direction, as is evident. This aft noodle region forms the BOAS aft end so that there is a good aerodynamic shape to divert gaspath air away from the vane, not shown. The bulge that the noodle forms better prevents eddy currents forming on the backside of the BOAS which could bring hot gaspath air radially outward into the seal 112 as well as into the vane not shown. In other words, the bulge directs the gaspath air away from 112 and the vane.

Figure 3:
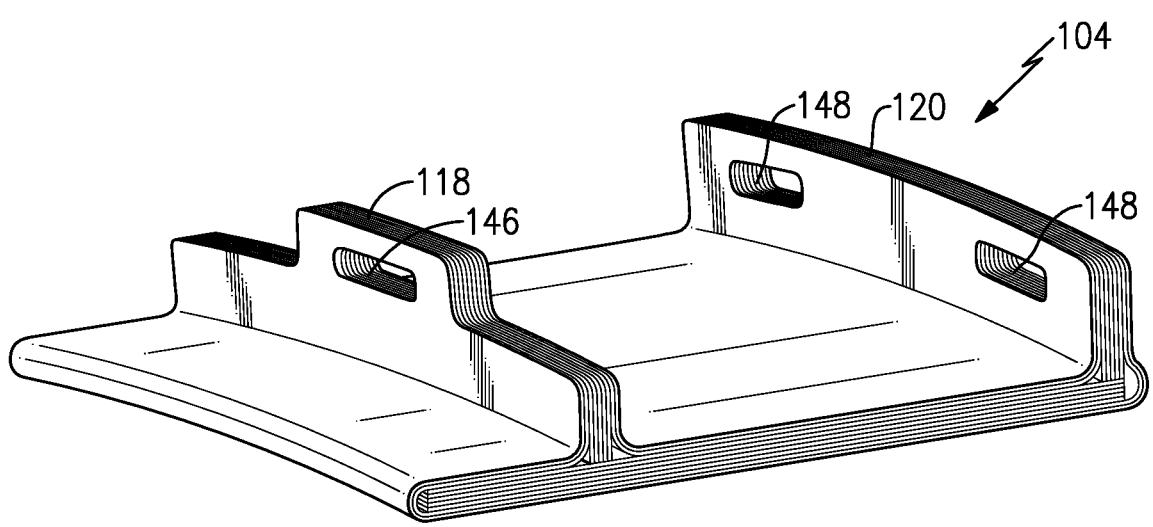
FIG. 3 shows a blade outer air seal.

FIG. 3 shows further details of the BOAS 104. Slots 146 are formed in the hook or support 118 and slots 148 are formed in the hook or support 120. Preferably, there are at least three slots such that there is 3 point contact between the support and the BOAS. Three point contact may be beneficial relative to four point contact in allowing for better stability of the BOAS. Of course, it is also possible to have two forward slots 146 and a single aft slot 148.

Figure 4A:
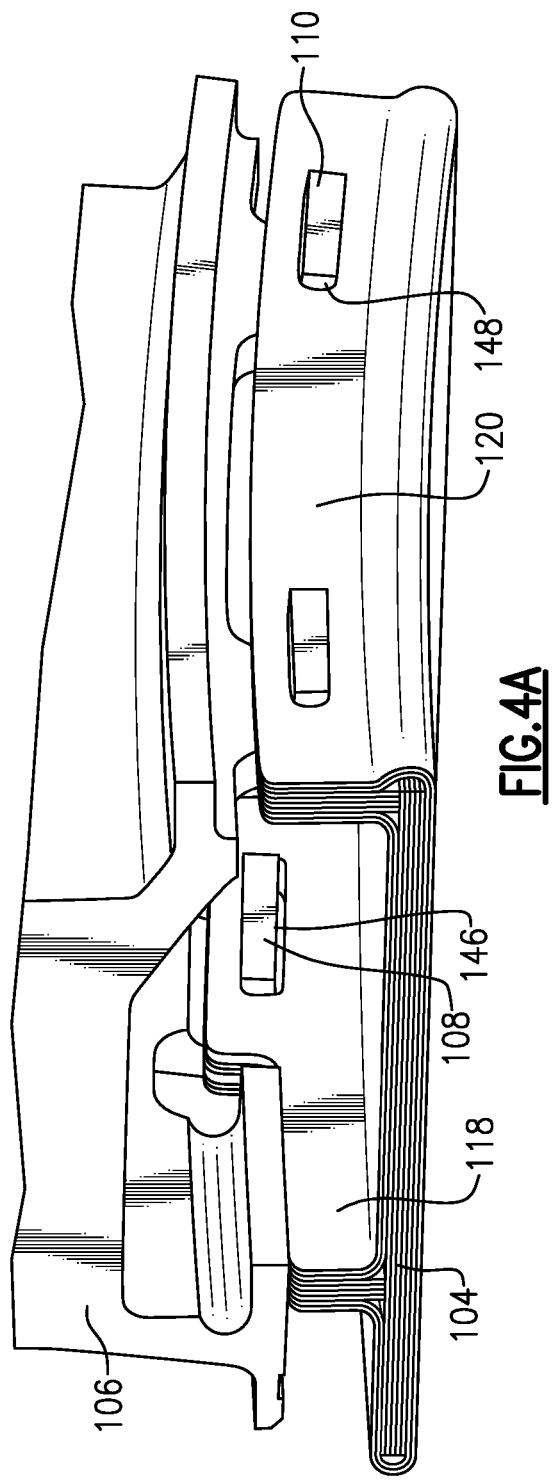
FIG. 4A shows a detail of a support and a blade outer air seal.

FIG. 4A shows the hook 108 within the slot 146 and the hooks 110 within the slot 148.

Figure 4C:
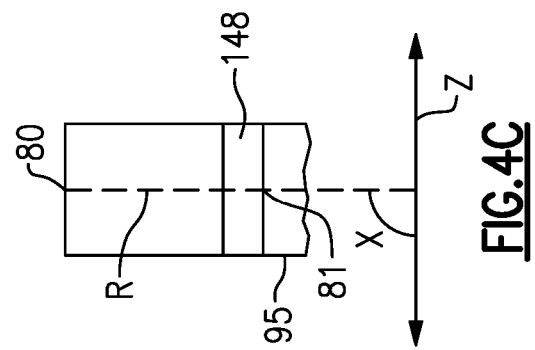
FIG. 4C shows a geometric feature.
Figure 4B:
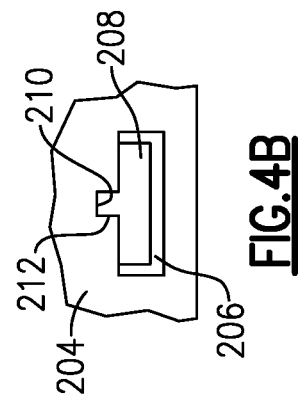
FIG. 4B shows an alternative embodiment.

FIG. 4B shows an alternative feature wherein a BOAS 204 has a slot 206 with a notch 212. The hook 208 has a peg 210 which sits within the notch 212. This provides an anti-rotation feature.

FIG. 4C shows a feature, as described above, in a hook or support 120 (hook or support 118 has similar features) and serves to further describe the meaning of the term "generally radially" as utilized in this application. From an axial central point 80 of support 118, in this exemplary hook support, there is a slot 148. This is thus a section taken generally perpendicular, to say, the slot 146 of FIG. 3. Again hook 118 and slot 108 would have the same features.

A line R is defined in a radial direction from the point 80 and inwardly to intersect axis Z (see FIG. 2). A point 81 is the radially innermost end of the slot 148. The actual center of the hook 120 through the distance between points 80 and 81 is within 10° of the radius R. In embodiments, it is within 5°.

Note, the seal point or point of contact 95 between the axial seal and the forward hook is within the distance through which the angular relationship exists.

Figure 5:
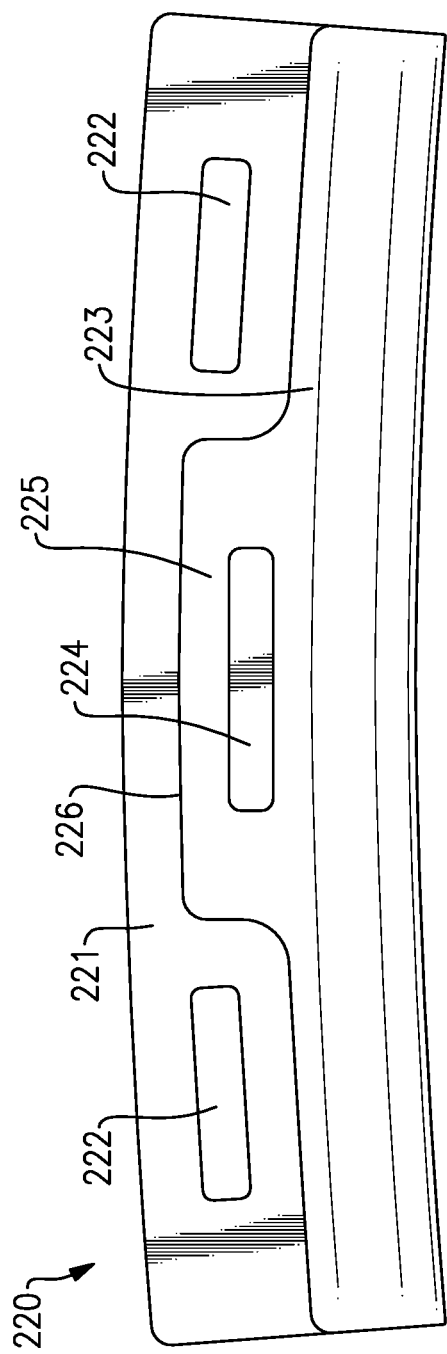
FIG. 5 shows another alternative.

FIG. 5 shows an alternative embodiment 220. In embodiment 220, aft slots 222 are shown in a hook or support 221, and the forward slots 224 are formed in a finger 225 extending radially outwardly of the hook or support 223. As shown, the finger 225 is circumferentially intermediate the slots 222. In addition, the slot 224 is radially inward of the slots 222. The BOAS 220 can be assembled in an aft to forward direction, as the aft hooks for being received in the slots 222 will not interfere with movement of the finger 225.

Figure 6:
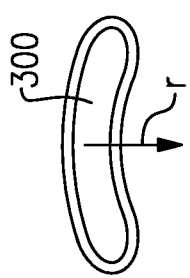
FIG. 6 shows one embodiment

In all of the above embodiments, the slots can be a number of different shapes. As shown in FIG. 6, the slots 300 can be formed on a radius r. The slots could also be generally rectangular, as shown for example in FIG. 3 or 5. Other shapes such as circular, are also possible. Thus, for purposes of this application the term "slot" should not be seen as limiting on the shape of any opening. If the shape is to be limited the claims will utilize additional words to so limit the shape.

Figure 7A:
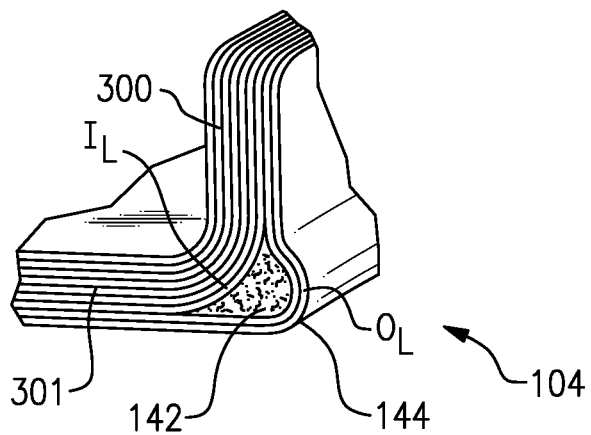
FIG. 7A shows one embodiment.

FIG. 7A shows further details of the noodle 144 on the BOAS 104. As shown, there is a fiber/matrix filler 142, such that the outer laminate layers $O_L$ and inner laminate layers $I_L$ with the matrix/fiber non-laminate material 142 axially intermediate. In place of material 142, laminate material or monolithic materials may be used. In addition, as can be appreciated, the aft support 300, as shown here, does not have separate laminate such as laminate 126 of the FIG. 2 embodiment, but rather, the laminate 300 have a radially inwardly extending portion, then bends into a portion 301, which forms part of the central web. This reduces the number of required layers in the aft support.

Figure 7B:
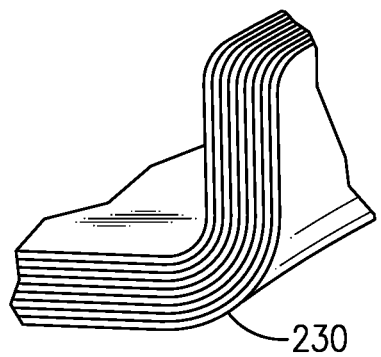
FIG. 7B shows another embodiment.

FIG. 7B shows an alternative 230 where there is not the internal material 142, nor the noodle 144. A benefit of the FIG. 7B embodiment is that the elimination of the noodle region simplifies manufacturing and may be beneficial in lower temperature turbine applications where surrounding geometry can better handle gaspath temperatures.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A gas turbine engine comprising:
   a turbine blade extending radially outwardly to a radially outer tip and for rotation about an axis of rotation;
   a blade outer air seal positioned radially outwardly of said radially outer tip of said turbine blade, said blade outer air seal having a forward hook at an axially forward location and an aft hook at an axially aft location, with an axial direction being defined by a rotational axis of said turbine blade;
   said blade outer air seal having a central web extending axially between said forward and aft hooks, and said forward and aft hooks extending generally radially outward from said central web, and having slots for being received on forward and aft support hooks of a blade outer air seal support, and said forward and aft support hooks being separate spaced components;

said blade outer air seal formed of a plurality of laminate layers of ceramic matrix composites; and wherein said aft hook has a bulged noodle extending in a direction that includes both a radial and an axial component, and creating a hollow, and said hollow is filled with a fiber and matrix material.

2. A gas turbine engine comprising:

a turbine blade extending radially outwardly to a radially outer tip and for rotation about an axis of rotation;

a blade outer air seal positioned radially outwardly of said radially outer tip of said turbine blade, said blade outer air seal having a forward hook at an axially forward location and an aft hook at an axially aft location, with an axial direction being defined by a rotational axis of said turbine blade;

said blade outer air seal having a central web extending axially between said forward and aft hooks, and said forward and aft hooks extending generally radially outward from said central web, and having slots received on forward and aft support hooks of a blade outer air seal support, and said forward and aft support hooks being separate spaced components;

said blade outer air seal formed of a plurality of laminate layers of ceramic matrix composites;

wherein said aft hook has a bulged noodle extending in a direction that includes both a radial and an axial component, and creating a hollow, and said hollow is filled with a fiber and matrix material;

wherein the term extending generally radially is defined by a line (R) taken from an axially central point (80) at a radially outermost point on of each said forward and aft hook, extending through an axial center of said slots is within 10° of a radius;

wherein said aft hook is pressure loaded against an aft static member when the gas turbine engine is operated;

wherein said aft static member is an aft seal; and wherein said aft support hook is also provided with a radially spaced second hook that does not extend through a slot in said aft hook, and said aft support hook and said spaced second hook are urged against said aft seal to provide a stop surface.

\* \* \* \* \*